United States Patent [19]

Park

[11] Patent Number: 5,701,807
[45] Date of Patent: Dec. 30, 1997

[54] FRYING PAN HAVING COOKING OIL SUPPLY DEVICE

[76] Inventor: Dong-Gyun Park, 560-6, Koyo-dong, Songpa-ku, Seoul, Rep. of Korea

[21] Appl. No.: 724,648

[22] Filed: Oct. 1, 1996

[30] Foreign Application Priority Data

Oct. 6, 1995 [KR] Rep. of Korea .................. 1995-28024

[51] Int. Cl.$^6$ ........................................................ A47J 27/00
[52] U.S. Cl. ............................................. 99/422; 126/380
[58] Field of Search .................... 99/422, 403; 126/373, 126/380

[56] References Cited

U.S. PATENT DOCUMENTS 1,209,551  12/1916  Burns .............................. 126/380
2,204,467  6/1940  Beatson .......................... 126/380

*Primary Examiner*—Reginald L. Alexander
*Attorney, Agent, or Firm*—Smith Patent Office

[57] ABSTRACT

A frying pan having a cooking oil supply device is disclosed, in which the cooking oil is supplied into the frying pan by means of a piston, the piston being slidably installed within a cylinder. The frying pan having a cooking oil supplying device includes: the main body 10 of the frying pan for cooking foods; a heat insulating member 16 coupled with a coupling portion 12 of a wall portion 10b of the main body 10, for blocking a thermal conduction from a bottom 10a of the main body 10; a cooking oil storing device 20 coupled to an end of the heat insulating member 16, for storing a cooking oil and for serving as a handle; and a coupling means 18 for coupling the heat insulating member 16 and the cooking oil storing device 20 together in an air-tight state.

8 Claims, 3 Drawing Sheets

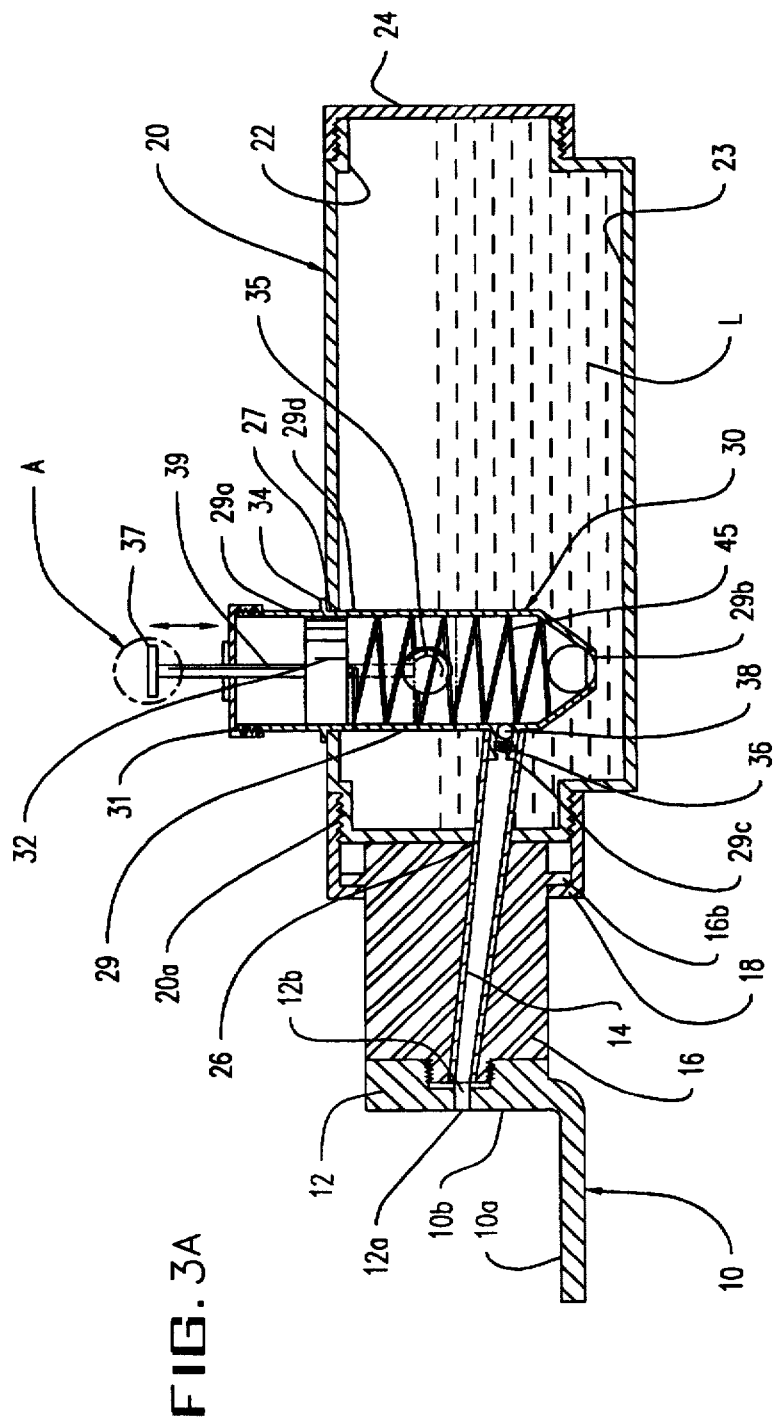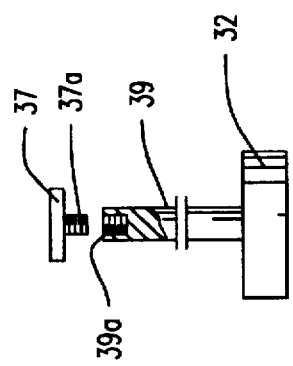
FIG. 3A
FIG. 3B

FRYING PAN HAVING COOKING OIL SUPPLY DEVICE

BACKGROUND OF THE INVENTION

1. Field of the Invention

The present invention relates to a frying pan used for cooking foods in kitchen. Particularly, the present invention relates to a frying pan having a cooking oil supply device, in which the cooking oil is supplied into the frying pan by means of a piston, the piston being slidably installed within a cylinder.

2. Description of the Prior Art

Conventionally, there are such frying pans, and they are disclosed in Japanese Utility Model Application Laid-open No. Sho-54-77265 (laid-open in Showa 54, or Jun. 1, 1979), and in Japanese Utility Model Application Laid-open No. Sho-55-13580 (laid-open in Showa 55, or Jan. 28, 1980). Of these frying pans, the one which is disclosed in Japanese Utility Model Application Laid-open No. Sho-54-77265 is as shown in FIG. 1.

Referring to FIG. 1, an electrical heating line (not shown) is installed under a bottom 2 of a frying pan 1, and an annular cooking oil flowing groove 3 is formed between the periphery of the bottom 2 and an circumferential edge 2b.

Further, at a position of the cooking oil flowing groove 3, there is formed an oil draining hole 4, and two handles 5 are symmetrically installed on the sides of the bottom 2 of the frying pan 1.

In the frying pan constituted as described above, when a food is to be cooked, the cooking oil is supplied by using a spoon or directly from a cooking oil bottle.

However, if this frying pan is to be used in a restaurant, or if a large amount of food is to be cooked in general homes, the cooking oil has to be manually supplied at the end of every round of cooking. Therefore, it is not only troublesome to manually supply the cooking oil repeatedly, but also it is difficult to supply the cooking oil in proper amounts, with the result that a severe inconvenience has to be experienced by the cooking person.

SUMMARY OF THE INVENTION

The present invention is intended to overcome the above described disadvantages of the conventional technique.

Therefore it is an object of the present invention to provide a frying pan having a cooking oil supplying device, in which the cooking oil is supplied to the bottom of the frying pan in a special manner, so that the use would be convenient.

It is another object of the present invention to provide a frying pan having a cooking oil supplying device, in which the amount of the cooking used can be significantly reduced.

In achieving the above objects, the frying pan having a cooking oil supplying device according to the present invention includes: a main body of the frying pan for cooking foods; a heat insulating member coupled with a coupling portion of a wall portion of the main body, for blocking a thermal conduction from a bottom of the main body; a cooking oil storing device coupled to an end of the heat insulating member, for storing a cooking oil and for serving as a handle; and a coupling means for coupling the heat insulating member and the cooking oil storing device together in an air-tight state.

BRIEF DESCRIPTION OF THE DRAWINGS

The above object and other advantages of the present invention will become more apparent by describing in detail the preferred embodiment of the present invention with reference to the attached drawings in which:

FIG. 3A is a sectional view showing an assembled state of the frying pan of FIG. 2; and FIG. 3B is an exploded enlarged view of the portion A of FIG. 3A.

DETAILED DESCRIPTION OF THE PREFERRED EMBODIMENT

Figure 1:
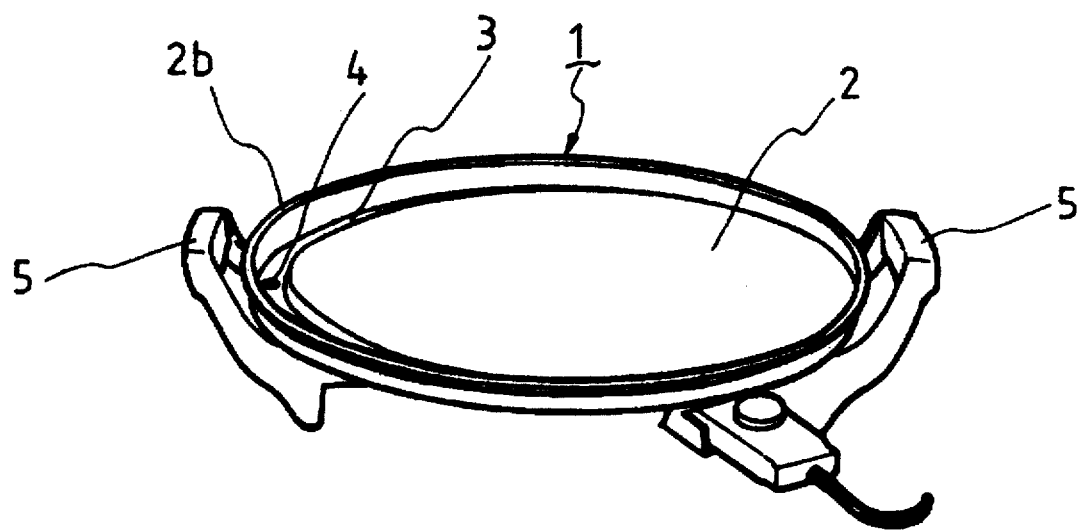
FIG. 1 is a perspective view showing a conventional frying pan.
Figure 2:
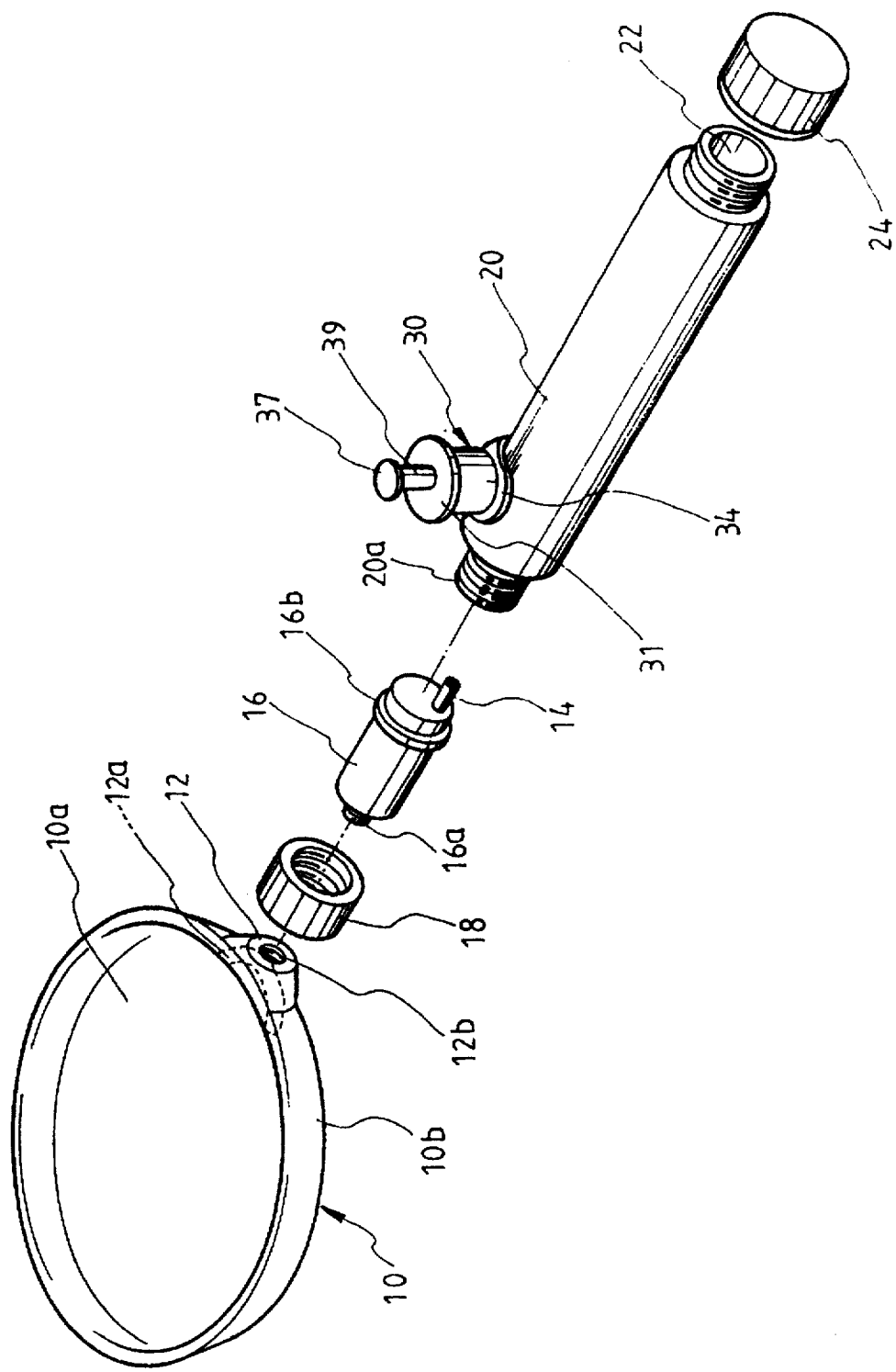
FIG. 2 is an exploded perspective view showing the constitution of the frying pan having a cooking oil supplying device according to the present invention.

FIG. 2 is an exploded perspective view showing the constitution of the frying pan having a cooking oil supplying device according to the present invention. FIG. 3A is a sectional view showing an assembled state of the frying pan of FIG. 2. FIG. 3B is an exploded enlarged view of the portion A of FIG. 3A.

Referring to FIGS. 2 and 3, reference code 10 indicates a main body of the frying pan.

The frying pan having a cooking oil supplying device according to the present invention includes: the main body 10 of the frying pan for cooking foods; a heat insulating member 16 coupled with a coupling portion 12 of a wall portion 10b of the main body 10, for blocking a thermal conduction from a bottom 10a of the main body 10; a cooking oil storing device 20 coupled to an end of the heat insulating member 16, for storing a cooking oil and for serving as a handle; and a coupling means 18 for coupling the heat insulating member 16 and the cooking oil storing device 20 together in an air-tight state.

The main body 10 includes: the bottom 10a; the wall portion 10b formed integrally with the bottom 10a around it; a plurality of oil supply passages 12a formed on a side of the wall portion 10b and communicating to the bottom 10a; and the coupling portion 12 having a through hole 12b for receiving the cooking oil from the cooking oil storing device 20 through the heat insulating member 16.

The heat insulating member 16 is coupled to the coupling portion 12 of the wall portion 10b, and is made of a heat insulating material, so that the heat from the main body 10 of the frying pan can be blocked during a cooking, and that the cooking oil stored in the cooking oil storing device 20 can be prevented from being degenerated.

This heat insulating member 16 includes: a coupling protuberance 16a having external threads so as to be threadably coupled to the through hole 12b of the coupling portion 12; a flange 16b integrally formed around the circumference thereof; and an oil supply tube 14 constituting a through passage in a lengthwise direction so as to supply the cooking oil to the bottom 10a of the main body 10.

The coupling protuberance 16a has a hollow oil supply passage communicating to the oil supply tube 14, so that the cooking oil can be supplied through the through hole 12b of the coupling portion 12 and the oil passages 12a of the wall portion 10b to the bottom 10a.

The cooking oil storing device 20 is made of a transparent material, so that the amount of the internal storage of the cooking oil L can be confirmed by the human eyes.

The cooking oil storing device 20 includes: a thread portion 20a having a throughhole 26 for receiving the oil supply tube 14 of the heat insulating member 16, and for being coupled with the heat insulating member 16 in an air-tight state by means of the coupling means 18; a hollow portion 23 for storing the cooking oil L; a cooking oil injecting/discharging hole 22 for discharging the stored cooking oil L out of the hollow portion 23 and for injecting the cooking oil L into the hollow portion 23; a cap 24 for sealingly closing the cooking oil injecting/discharging hole 22; and a cooking oil supplying means 30 for supplying the cooking oil L from the hollow portion 23 through the oil supply tube 14 and the oil supply passages 12a of the wall portion 10b to the bottom 10a.

The cooking oil supplying means 30 is installed in the cooking oil storing device 20 in such a manner that it absorbs the cooking oil L from the hollow portion 23 and supplies the absorbed cooking oil L through an outlet 29c to the oil supply tube 14 of the heat insulating member 16.

The cooking oil supplying means 30 includes: a suction hole 29b for sucking the cooking oil L from the hollow portion 23 of the cooking oil storing device 20; a cylinder 29 having an outlet 29c for supplying the sucked cooking oil L to the oil supply tube 14 of the heat insulating member 16; a cooking oil sucking/discharging unit installed within the cylinder 29, for sucking the stored cooking oil L from the hollow portion 23 of the cooking oil storing device 20 through the suction hole 29b so as to supply it through the outlet 29c to the oil supply tube 14; an elastic member 45 for forcing up the cooking oil sucking/discharging unit; a steel ball 35 installed between the elastic member 45 and the suction hole 29b of the cylinder 29 in a vertically movable manner, so as to suck the stored cooking oil L into the cylinder 29 from the hollow portion 23 of the cooking oil storing device 20 during the upward movement of the cooking oil sucking/discharging unit, and so as to close the suction hole 29b to prevent the introduction of the cooking oil into the cylinder 29 during a downward movement of a piston 32; a cooking oil discharging unit installed within the outlet 29c, for supplying the cooking oil L through the oil supply tube 14 to the bottom 10a of the main body 10 of the frying pan during a downward movement of the cooking oil sucking/discharging unit; and a cap 31 for covering the upper opening of the cylinder 29, a supporting rod 39 of the cooking oil sucking/discharging unit passing through the cap 31.

The cooking oil sucking/discharging unit includes: a pushing member 37; a piston 32 installed slidably within the cylinder 29; and a supporting rod 39 connected between the pushing member 37 and the center of the top of the piston 32, and passing through the cap 31.

The cylinder 29 includes: an air hole 29a formed on a side of an upper portion of the cylinder 29, for introducing and discharging the air to and from the upper portion of the cylinder 29 so as to make the piston smoothly actuated; and an air inlet 29d formed on a side of a lower portion of the cylinder 29, for introducing a part of the air of the upper portion of the cylinder 29 into the hollow portion 23 of the cooking oil storing device 20.

The cooking oil discharging unit includes: a steel ball 38 for closing the outlet 29c during the upward movement of the cooking oil sucking/discharging unit, and for opening the outlet 29c during the downward movement of the cooking oil sucking/discharging unit; and an elastic means 36 for pushing the steel ball 38 toward the cylinder 29 during the closing of the outlet 29c.

The cylinder 29 is secured to the cooking oil storing device 20 by means of supporting members 34 by carrying out soldering or welding, or the cylinder 29 may be threadably coupled to the cooking oil storing device 20.

Now the frying pan having a cooking oil supplying means according to the present invention will be described as to its assembling, operation and effects.

First, the flange 16b of the heat insulating member 16 is inserted into the coupling means to the hilt. Then the coupling protuberance 16a which is formed on the leading end of the heat insulating member 16 is threadably coupled with the coupling portion 12 which is formed on a side of the wall portion 10b of the main body 10, in such a manner that the oil passages 12a should be communicated with the oil supply tube 14. Then the oil supply tube 14 is joined to the outlet 29c of the cylinder 29 in an air tight state. Then the coupling means 18 with the heat insulating means inserted into it is threadably coupled with the thread portion 20a of the cooking oil storing device 20, and thus, the main body 10 of the frying pan is coupled through the heat insulating member 16 to the cooking oil storing device 20.

Under this condition, one end of the coupling means 18 is contacted with the flange 16b of the heat insulating member 16, while the other end of the coupling means 18 is threadably coupled with the thread portion 20a. Therefore, the state that the oil supply tube 14 communicates with the outlet 29c is securely maintained.

Then, the cooking oil L is injected through the cooking oil injecting/discharging hole into the hollow portion 23 of the cooking oil storing device 20. Then the cooking oil injecting/discharging hole 22 is closed with the cap 24, so that the cooking oil L cannot be leaked to the outside.

After the completion of the injection of the cooking oil L into the hollow portion 23 of the cooking oil storing device 20, the main body 10 is placed upon a heating means (not shown), and then, the pushing member 37 of the cooking oil sucking/discharging unit is pushed. Then the piston 32 together with the supporting rod 39 moves downward, so that the cooking oil contained within the cylinder 29 would be pressed. Consequently, the steel ball 38 pushes the elastic means 36 within the outlet 29c, and therefore, the outlet 29c is opened. Consequently, the cooking oil L is supplied through the oil supply tube 14, the through hole 12b, and the oil passages 12a to the bottom 10a of the main body 10 of the frying pan.

Under this condition, the steel ball 35 closes the suction hole 29b of the cylinder 29, and therefore, the cooking oil L within the cylinder 29 cannot return to the hollow portion 23 of the cooking oil storing device 20.

After the cooking oil L has been supplied through the oil supply tube 14, the piston 32 of the cooking oil sucking/discharging unit is forced up by the elastic member 45 to move upward. In this situation, the steel ball 35 is made to move up by the sucking force of the cooking oil L, with the result that the suction hole 29b of the cylinder 29 is opened. Meanwhile, the outlet 29c of the cylinder 29 is closed by the force of the elastic means 36. Consequently, the cooking oil L which remains within the cylinder 29 is not further supplied to the bottom 10a of the main body 10, while the cooking oil L of the hollow portion 23 of the cooking oil storing device 20 is sucked into the cylinder 29 through the suction hole 29b.

Further, in the case where the piston 32 of the cooking oil sucking/discharging unit is made to actuate many times due to a large amount of the cooking food or due to a large size of the bottom 10a of the main body 10 of the frying pan, the steel ball 35 closes the suction hole 29b of the cylinder 29, so that the cooking oil L within the cylinder 29 cannot return to the hollow portion 23 of the cooking oil storing device 20.

Further, through the air holes 29a and 29d which are formed on the side wall of the cylinder 29, the air which has been introduced into the space of the cylinder 29 is supplied to the upper portion of the hollow portion 23 of the cooking oil storing device 20, or the air within the upper portion of the hollow portion 23 is supplied into the cylinder 29. Therefore, the piston 23 can move up and down smoothly.

Meanwhile, after the completion of the cooking of food, the cap 24 is opened, and the remaining cooking oil L is evacuated through the cooking oil injecting/discharging hole 22. Then the hollow portion 23 of the cooking oil storing device 20 is cleaned, and kept in a clean state.

The cooking oil storing device 20 is made of a heat resistant transparent material, and therefore, the level of the cooking oil L within the hollow portion 23 can be confirmed any time, so that the refilling time for the cooking oil L can be precisely judged.

According to the present invention as described above, the required amount of the cooking oil can be supplied to the bottom of the frying pan by manipulating the piston in a simple manner. Therefore the use of the frying pan is very convenient, the supply of the cooking oil can be properly adjusted, and the amount of the consumption of the cooking oil can be significantly reduced.

In the above, the descriptions were made based on the specific embodiment of the present invention with reference to the attached drawings. However, it should be understood that the present invention is not to be limited to the specific embodiment, but various changes and modifications can be added without departing from the scope of the present invention as defined in the appended claims.

What is claimed is:

1. A frying pan having a cooking oil supplying device, comprising:
   a main body of the frying pan for cooking foods;
   a wall portion defined by said main body, said wall portion having a coupling portion;
   a heat insulating member coupled with said coupling portion, for blocking a thermal conduction from a bottom of said main body;
   a cooking oil storing device coupled to an end of said heat insulating member, for storing a cooking oil and for serving as a handle; and
   a coupling means for coupling said heat insulating member and said cooking oil storing device together in an air-tight state.

2. The frying pan as claimed in claim 1, wherein said main body comprises:
   said bottom;
   said wall portion formed integrally with said bottom around it;
   a plurality of oil supply passages formed on a side of said wall portion and communicating to said bottom; and
   said coupling portion having a through hole for receiving the cooking oil from said cooking oil storing device through said heat insulating member.

3. The frying pan as claimed in claim 1, wherein said heat insulating member is coupled to a coupling portion formed on said wall portion, and is made of a heat insulating material so as to serve as a thermal barrier for a heat from said heated main body of the frying pan during a cooking, and so as to prevent a degeneration of the cooking oil of said cooking oil storing device due to the heat.

4. The frying pan as claimed in claim 1, wherein said heat insulating member comprises:
   a coupling protuberance having external threads so as to be threadably coupled to the through hole of said coupling portion;
   a flange integrally formed around the circumference thereof; and
   an oil supply tube constituting a through passage in a lengthwise direction so as to supply the cooking oil to said bottom of said main body.

5. The frying pan as claimed in claim 1, wherein said cooking oil storing device is made of a transparent material so as to make it possible to confirm the amount of the stored cooking oil by human eyes.

6. The frying pan as claimed in claim 1, wherein said cooking oil storing device comprises:
   a thread portion having a through hole for receiving said oil supply tube of said heat insulating member, and for being coupled with said heat insulating member in an air-tight state by means of said coupling means;
   a hollow portion for storing the cooking oil;
   a cooking oil injecting/discharging hole for discharging the stored cooking oil out of said hollow portion and for injecting the cooking oil into said hollow portion;
   a cap for sealingly closing said cooking oil injecting/discharging hole; and
   a cooking oil supplying means for supplying the cooking oil from said hollow portion through said oil supply tube and said oil supply passages of said wall portion to said bottom.

7. The frying pan as claimed in claim 6, wherein said cooking oil supplying means is installed in said cooking oil storing device in such a manner that it absorbs the cooking oil from said hollow portion and supplies the absorbed cooking oil through an outlet to said oil supply tube of said heat insulating member.

8. The frying pan as claimed in claim 6, wherein said cooking oil supplying means comprises:
   a cylinder having a suction hole for sucking the cooking oil from said hollow portion of said cooking oil storing device, and having an outlet for supplying the sucked cooking oil to said oil supply tube of said heat insulating member;
   a cooking oil sucking/discharging unit installed within said cylinder, for sucking the stored cooking oil from said hollow portion of said cooking oil storing device through said suction hole so as to supply it through said outlet to said oil supply tube;
   an elastic member for forcing up said cooking oil sucking/discharging unit;
   a steel ball installed between said elastic member and said suction hole of said cylinder in a vertically movable manner, so as to suck the stored cooking oil into said cylinder from said hollow portion of said cooking oil storing device during the upward movement of said cooking oil sucking/discharging unit, and so as to close said suction hole to prevent the introduction of the cooking oil into said cylinder during a downward movement of a piston;
   a cooking oil discharging unit installed within said outlet, for supplying the cooking oil through said oil supply tube to said bottom of said main body of the frying pan during a downward movement of said cooking oil sucking/discharging unit; and
   a cap for covering the upper opening of said cylinder, a supporting rod of said cooking oil sucking/discharging unit passing through it.

* * * * *